United States Patent [19]
Sellers et al.

[11] Patent Number: 5,945,057
[45] Date of Patent: Aug. 31, 1999

[54] RADIANT HEATER AND METHOD OF POST-FORMING THIN ACRYLIC SHEETS

[76] Inventors: Thomas Sellers, 59 Lincoln Dr., Laurel Springs, N.J. 08021; David McEwen, 2208 Victoria Ave., Newfield, N.J. 08344

[21] Appl. No.: 08/915,419

[22] Filed: Aug. 20, 1997

[51] Int. Cl.⁶ .............................. B29B 13/02; B29C 51/42
[52] U.S. Cl. .................... 264/322; 425/384; 432/175; 432/209
[58] Field of Search .................... 264/322, 522, 264/553, 544; 425/384, 395; 432/224, 209, 175

[56] References Cited

U.S. PATENT DOCUMENTS

| | | |
|---|---|---|
| 3,311,104 | 3/1967 | Wollner et al. . |
| 3,373,233 | 3/1968 | Rondum . |
| 3,582,388 | 6/1971 | Stayner ................................. 264/322 |
| 3,619,864 | 11/1971 | Birch ..................................... 264/322 |
| 3,661,486 | 5/1972 | MacDonald . |
| 3,813,706 | 6/1974 | Williams ............................. 4/187 R |
| 4,140,100 | 2/1979 | Ishihara . |
| 4,319,125 | 3/1982 | Prince ................................... 432/209 |
| 4,493,308 | 1/1985 | Hurley et al. ......................... 432/209 |
| 4,649,008 | 3/1987 | Johnstone et al. . |
| 4,949,491 | 8/1990 | DeMeritt . |
| 4,986,950 | 1/1991 | Long . |
| 5,236,658 | 8/1993 | Ford ...................................... 264/553 |
| 5,529,654 | 6/1996 | Kavanagh et al. . |
| 5,628,303 | 5/1997 | Ahmady et al. ..................... 432/209 |

Primary Examiner—Jan H. Silbaugh
Assistant Examiner—Michael Poe
Attorney, Agent, or Firm—Thomas A. Lennox; James J. Murtha

[57] ABSTRACT

A method and apparatus for post-forming an acrylic sheet using radiant heat are disclosed. The heating apparatus includes radiant heating tubes mounted to a frame and positioned in a heating plane. A support platform is also mounted to the frame. A heating area is defined between the heating tubes and the support platform. The heating area is substantially exposed to the atmosphere, allowing unheated air to exchange with the heated air in the heating area. To use the apparatus, combustible gas is ignited and passed through the radiant heating tubes, such that heat radiates from the tubes to the heating area. An acrylic sheet is placed on the support surface such that the unfinished side of the sheet faces the radiant heating tubes. The entire sheet is positioned in the heating area for a selected period of time. The heated sheet is then positioned in a mold until almost cool. At that point, the sheet is removed and allowed to cool completely.

7 Claims, 3 Drawing Sheets

RADIANT HEATER AND METHOD OF POST-FORMING THIN ACRYLIC SHEETS

BACKGROUND OF THE INVENTION

This invention is related to the field of custom forming and installation of acrylic counter tops. In particular, the invention is directed to a method and apparatus for molding preformed acrylic sheets into selected shapes.

Acrylic material and acrylic composites in the form of thick boards have long been used successfully as countertops and the like in kitchens and bathrooms. These "solid surface" materials have an attractive finish which can withstand exposure to a wide range of temperatures and materials without being damaged. Acrylic, however, is very difficult to mold after it has been formed. Consequently, it has been required that the counter tops and the like be formed in a shop. Further, any irregular surfaces, such as curves, rounded edges and backsplashes, must be separately formed and then glued into position on the acrylic boards. To employ acrylic materials at all, the space may needed to be built out to match the material, rather than forming the material to match the space. This need for labor and special forming, as well as the cost of the acrylic itself, has made the cost of using acrylic materials prohibitive.

Recently, acrylic materials have become available in thinner sheets, ranging from ⅛ inch to ¾ inch. The sheets are intended to be mounted onto wooden counters as a laminate layer, thereby forming a counter top which has the appearance and some of the increased durability of the solid surface counter tops but at a reduced cost. These sheets are not intended to be molded into curved shapes, like certain plastic laminates. Consequently, curved portions and backsplashes must still be separately formed and then glued together, as with traditional acrylic boards.

Attempts have been made to post-form these sheets using techniques employed for laminate sheets of other materials, such as plastic sheeting. Typically such efforts include taking the portion of the sheet intended to be formed and placing it in a closed-walled, convection oven. The convection oven is operated at a temperature of about 400° F. and the portion of the sheet is left in there for several minutes until the laminate sheet becomes flexible. This flexible portion is then molded to a selected shape which it retains after cooling.

Although the thin acrylic sheets are rendered flexible such that they can be molded when employing such techniques, these attempts have ultimately proved unsuccessful. Unlike the traditional laminate materials, the acrylic sheets tend to discolor (turning cloudy or whitish) when they are molded and cooled in this manner. Further, after a portion of the acrylic sheet has been heated and cooled, it becomes brittle where it joins the portion which has not been heated such that the acrylic sheet cannot be cut without splintering or shattering.

The instant invention includes methods and apparatus which overcome these difficulties, allowing for the post-forming of acrylic sheets without discoloration. The formed sheets can be cut to fit the installation space without splintering the edges. Consequently, the space itself does not necessarily need to be built out or modified to the acrylic sheet.

SUMMARY OF INVENTION

It is an object of an aspect of the present invention to provide a method of treating acrylic sheets to allow them to be post-formed without discoloration.

It is another object of an aspect of the invention to provide a heater for delivering heat to an acrylic sheet in a controlled manner such that the sheet can be molded without discoloring the sheet.

It is another object of an aspect of the invention to provide a heater and a method capable of putting an acrylic sheet into a moldable state without rendering the molded sheet uncuttable.

One aspect of the invention is directed to a method of post-forming an acrylic sheet. A radiant heating element is provided in a heating plane. A support platform has a support surface that extends substantially parallel to the heating plane. The support surface is disposed a fixed distance away from the heating plane. A heating area is defined by the space between the heating plane and the support surface. A substantial portion of the lateral sides of the heating area are left open, exposed to the atmosphere. The heating element is heated to a predetermined temperature. The entire acrylic sheet is placed in the heating area, with the finished face of the sheet on the support surface and the unfinished face of the sheet facing the heating element. The acrylic sheet is left in the heating area for a selected period of time until the sheet is moldable. Once removed from the heating area, the acrylic sheet is placed on a mold for a selected period of time until formed and then removed.

In accord with another aspect of the invention, an apparatus is provided for preparing an acrylic sheet for molding in a post-form mold. The apparatus includes a frame. A radiant heating element is mounted to the top of the frame and disposed in a heating plane. A support platform is mounted at the bottom of the frame. The support platform has a support surface which is in a plane substantially parallel to the heating plane. A heating area is located between the heating plane and the support surface and is open to the atmosphere. The support surface is adapted to maintain the acrylic sheet in the heating area at a predetermined distance between 6 and 10 inches from the radiant heating element.

In accord with another aspect of the invention, a method is provided for forming an acrylic sheet having a thickness, a top finished surface and a bottom unfinished surface. A radiant heating element is provided substantially in a heating plane. A support platform is provided having a flat support surface that extends substantially parallel to the heating plane. The support surface is disposed a fixed distance away from the heating plane. A heating area is defined by the space between the heating plane and the support surface. The heating area has lateral sides. A substantial portion of the lateral sides of the heating area are left exposed to the atmosphere. The radiant heating element is heated to a predetermined temperature. The entire acrylic sheet is placed in the heating area such that the top finished surface is on the support surface and the bottom unfinished surface is exposed to the radiant heating element. The entire acrylic sheet is left in the heating area for a selected period of time until the acrylic sheet is moldable. The acrylic sheet is removed from the heating area and the moldable acrylic sheet is then positioned on a mold. The acrylic sheet is left on the mold until it becomes substantially rigid. The acrylic sheet is then removed from the mold.

Certain implementations of the invention provide that the radiant heating element is a metal tube with hot gas passing through it. The exhaust from the metal tube is directed to pass within or proximate to the support platform. A valve may be provided to control the amount of exhaust gas directed back to the support platform.

A means, such as an electric or pneumatic motor, may be provided to elevate or lower the support platform toward or away from the radiant heater. Further, removable side baffles may be provided to isolate a portion of the heating area from the atmosphere, thereby containing the heat and increasing the temperature in the heating area.

DESCRIPTION OF PREFERRED EMBODIMENTS

Figure 1:
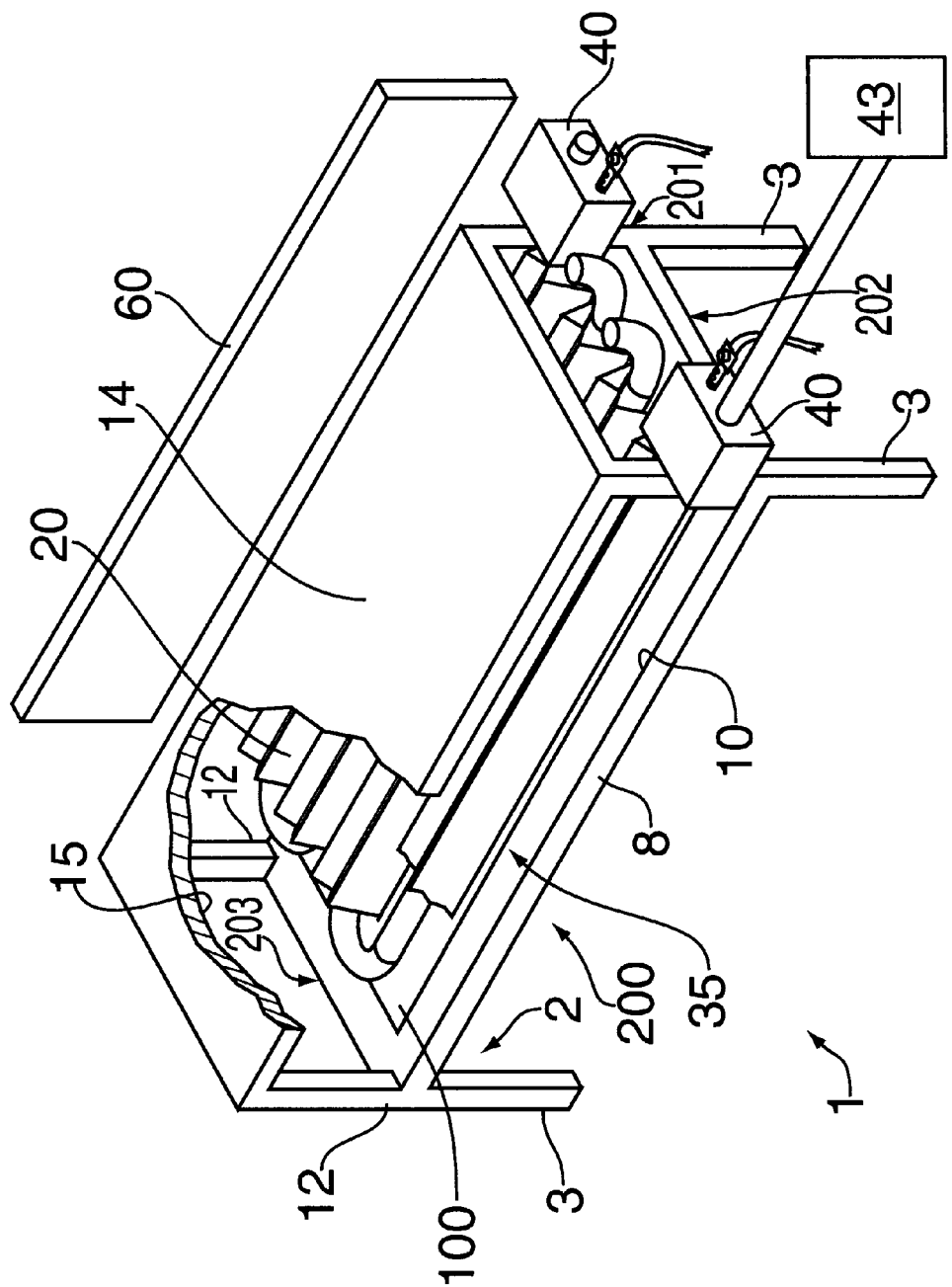
FIG. 1 is a perspective view of a heater in accord with an aspect of the invention.

Referring to FIG. 1, a perspective view of a heating apparatus 1 in accord with an aspect of the invention includes a frame 2 having legs 3. The frame has a substantially rectangular shape with two longitudinal sides 200,201, a front side 202 and a rear side 203. As currently preferred, the longitudinal sides are longer than the front and rear sides. It will be appreciated that the frame can have various shapes and still practice the invention.

A support platform 8 having a substantially rectangular shape is mounted to the frame 2 at the bottom of the frame. A support surface 10 is disposed at the top of the support platform in a horizontal plane and has a substantially rectangular shape. Preferably, the support surface is smooth and made of a heat reflective material which is able to withstand high temperatures. A sheet metal such as ⅜" steel has been found effective as the support surface. The support platform 8 is preferably formed, at least in part, from a heat insulating material, such as foam. Wall panels from standard refrigerators covered with galvanized steel have been found acceptable.

The frame 2 includes four columns 12 extending directly above the legs 3. A top platform 14 is mounted on top of the columns. Preferably, the top platform is parallel to the support platform and separated from the support platform by about two feet. The bottom surface 15 of the top platform is made of heat reflective material, such as metal sheeting or the like. The top platform itself may be formed of an insulating material, such as foam or the like, which will prevent the transfer of heat through the top platform.

A radiant heating element 20 (shown exploded in FIG. 2) is mounted to the frame 2 between the top platform 14 and the support platform 8. The radiant heating element may be suspended directly from the top platform. Preferably, the radiant heating element includes a series of U-shaped, hollow metal tubes 21 suspended from the top platform by hangers. Preferably, the radiant heating element is 20 feet or 12 feet long. Consequently, two or one piece of acrylic sheeting can fit easily under the heating element without being too close to the edges (where cold spots can form).

Figure 2:
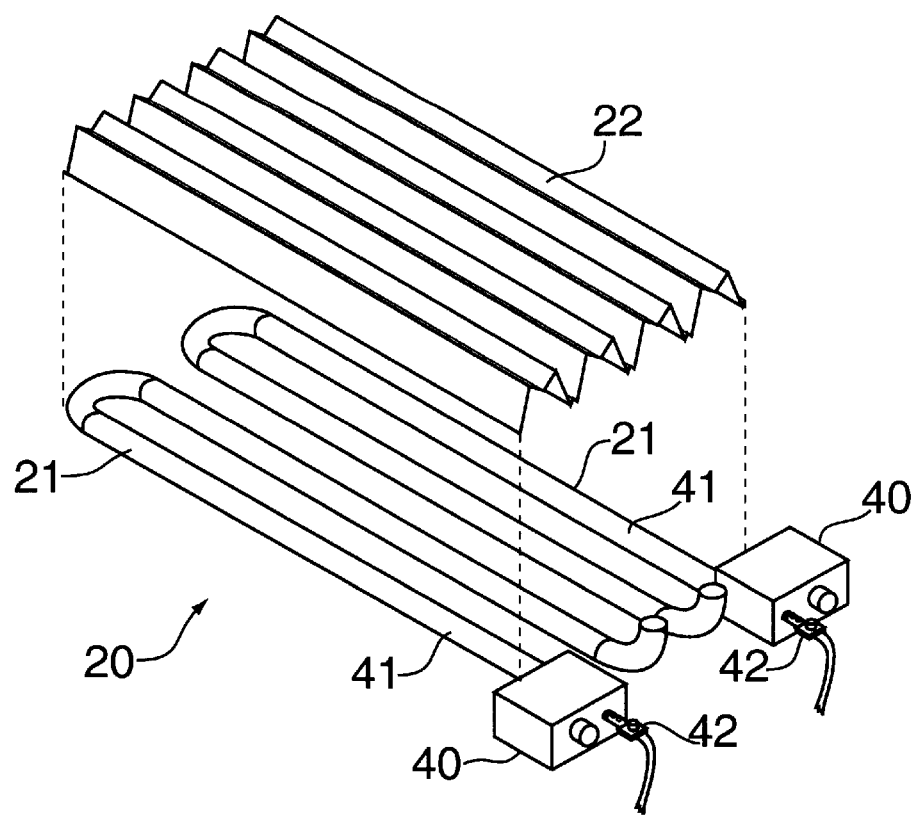
FIG. 2 is an exploded, perspective view of a radiant heating element used with the heater of FIG. 1.
Figure 3:
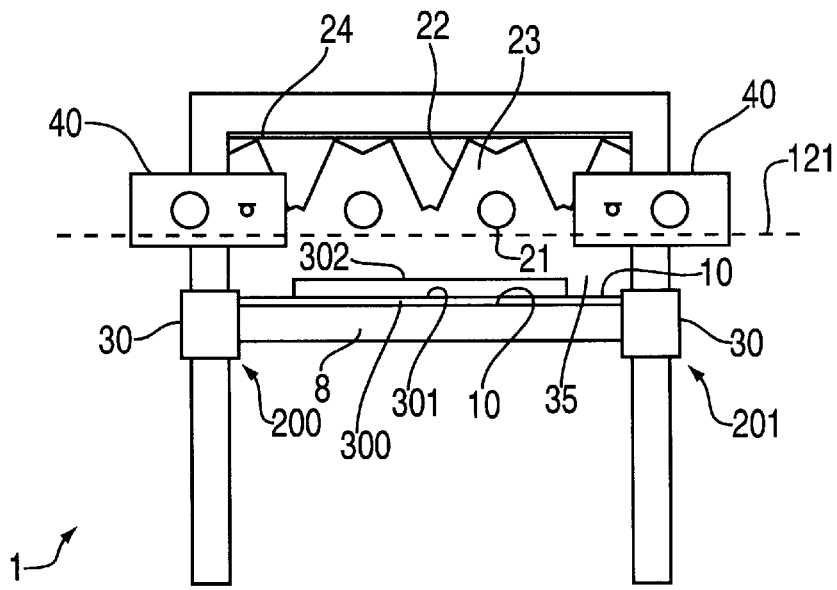
FIG. 3 is a front end elevation view of the heater of FIG. 1.

A reflective sheeting 22 may be mounted to the frame 2 between the top platform 14 and the tubes 21. As shown in FIGS. 2 and 3, the reflective sheeting preferably has an angled shape, forming a channel 23 in which the tube sits. The heating element and reflective sheeting may include the structures disclosed in U.S. Pat. Nos. 4,319,125 and 4,979,491, incorporated herein by reference. An additional reflecting panel 24 may be provided between the angled reflective sheeting 22 and the top platform 14. This additional reflecting panel has a flat rectangular shape.

The tubes 21 extend in a single heating plane 121 (see FIG. 3). The heating plane is preferably disposed about 8" above the support surface 10. The heating plane is parallel to the support surface and thus is preferably also in a horizontal plane. Currently, it is preferred that the support surface remain a fixed distance from the heating plane. However, a motor/ratchet mechanism 30 for elevating or lowering the support surface may also be provided at the legs 3. Of course, other means for elevating the support platform (or the radiant heater element) may be provided.

A heating area 35 is defined as the region between the heating plane 121 and the support surface 10. The heating area is exposed to the atmosphere, allowing non-heated, non-dried air from the atmosphere to exchange readily with the heated air in the heating area. Although it has not been found necessary, a blower may be provided to accelerate the exchange of air. Baffle walls 60 (see FIG. 1) may be removably attached to the frame 2 by screws, bolts, latches and the like, thereby closing off a portion of the heating area from the atmosphere. Preferably, the baffle walls are provided along no more than two or three sides of the heating area thereby exposing a substantial portion of the lateral sides to the atmosphere. The baffle walls are made of an insulating material covered with a heat reflective material, thereby focusing the heat back into the heating area.

A burner 40 is provided at the inlet 41 of each U-shaped tube 21. While various burners may be employed and practice the invention, a burner by Detroit Radiant Products Co. of Warren, Mich. has been found acceptable. An ignition 42 (see FIG. 2), which may be an electric ignition as is known in the art, is included in the burner. A control valve may be included in the burner as well, allowing the amount of radiant heat to be selected by the user. A combustible gas is delivered to the burner at a controlled rate from a gas source 43 (shown schematically in FIG. 1). The gas source may be a tank, a natural gas line or other source of combustible gas. The burner ignites the gas and transmits the burning gas along the tube. A blower may be provided to force the ignited gas down the tube 21. Heat then radiates from the surface of the tube. It will be understood that a single burner may be provided and all the tubes may be connected in a single serpentine path, or multiple burners can be employed, and still practice the invention. As shown in FIG. 1, the burners are both on the same side of the heater 1. However, it will be appreciated that the burners may be positioned on opposite ends of the heater (i.e., one at the front end and one at the rear end). Of course, in this application, one of the U-shaped tubes would be rotated such that the inlet to the tube aligns with the burner. In certain applications, this may provide a more even heat distribution.

As shown in the drawings, and as currently preferred, the U-shaped tubes 21 extend longitudinally from the front end 202 to the rear end 203 of the frame 2. Of course, the tubes may be arranged such that they extend from one longitudinal end 200 of the frame to the other 201. In such cases it may be necessary to provide additional tubes and burners, as one skilled in the art would appreciate.

To operate the apparatus 1 of the current invention, the gas source 43 is opened, directing combustible gas to the burners 40. The ignition means 42 in the burners are actuated, igniting the combustible gas and blowing it into the tubes 21. The ignited gas causes the tube to radiate heat along its length. Preferably, the tube is substantially air-tight along its length, preventing leakage of the ignited gas into the heating area. The gas may be natural gas or other such fuel. It will be appreciated that other types of radiant heaters can be employed and still practice the invention.

The radiant heating element 20 is actuated for a period of time until it has heated the heating area 35. Typically, it takes about 30 minutes for the heating area to be heated adequately such that the acrylic sheets are heated in a reasonably short period of time. At this point, the air temperature in the heating area is about 220° F. It has been found that the air temperature in the heating area should be about 200° and 240° F.

Once the heating area 35 has been adequately heated, an entire acrylic sheet 300 is inserted into the heating area. Acceptable acrylic sheets are Gibraltar by Wilson Art and Corian by DuPont. It has been found critical that the entire acrylic sheet be placed in the heating area or the final molded product becomes difficult to cut. The acrylic sheet has a finished surface 301 and an unfinished surface 302. The finished surface is placed directly on the support surface 10 while the unfinished surface is exposed to the radiant heater 20. The support surface is positioned between 6 and 10 inches from the heating plane. Preferably, the support surface is positioned about 8 inches from the heating plane. It has been found that changing this distance results in a less-effective heating and an acrylic sheet which is less able to be molded.

The entire sheet is left in the heating area for a selected period of time. It has been found that the acrylic sheet can be left in the heating area between 5 and 20 minutes and the sheet can still be molded effectively. It has been found that an acrylic sheet having a thickness of 1/8" can be heated adequately in five to six minutes. A 1/4" thick sheet can be heated adequately in about eight minutes. A 1/2" thick sheet can be heated adequately in about 10 to 12 minutes. Thicker sheets would take a longer period of time.

Figure 4:
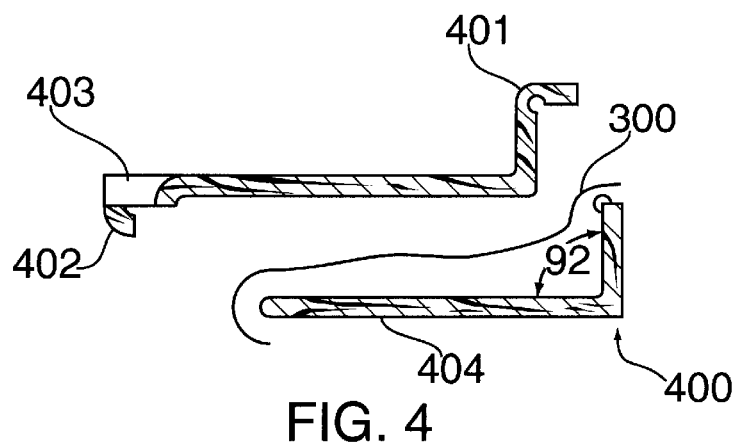
FIG. 4 is a side elevation view of an acrylic sheet heated in accord with the invention and positioned on a mold.
Figure 5:
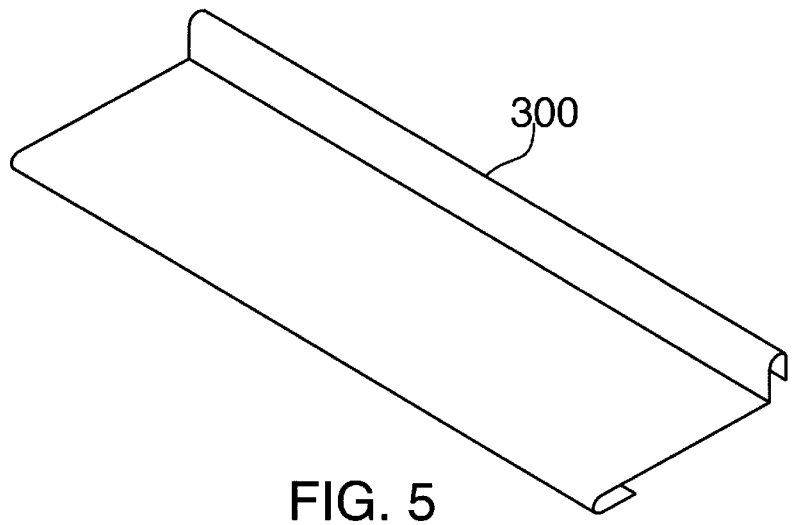
FIG. 5 is a perspective view of an acrylic sheet molded in accord with the invention and removed from the mold.

Once the acrylic sheet 300 is made flexible in the heating area, it is removed and placed on a mold 400 (see FIG. 4). The mold includes a wooden base form 404 on which the sheet is placed. A cover form 401, shaped and sized to mate with the base form, is then placed over the sheet. A sliding end cap 402 is mounted to a track carrier 403. Once the cover form is placed on the sheet, the end cap is moved along the carrier, pressing the sheet against the under surface of that base form. The sheet remains in place on the mold until almost cooled (about five minutes for 1/8" thick sheet). Once the sheet is removed from the mold, it continues cooling and changes its shape slightly. To achieve a 90° bend in the formed sheet, the angle 92 of the base mold should be about 91° to 92°. This formed sheet is used as a cover for wooden counter tops.

The support surface 10 is currently intended to be a flat plate. However, the surface may be a conveyor. In such case, the heating apparatus 1 is sized so that an acrylic sheet can be delivered at one end (e.g., the front end 201) and passed under the radiant heating element 20 at a controlled speed. As the acrylic sheet 300 is delivered to the other end, it has been heated adequately to be molded. Removable baffle walls 60 can be provided along the longitudinal sides of the heating area without interfering with the flow of the acrylic sheets. The speed of the conveyor can be used as a heat control, speeding up the conveyor to reduce the heat exposure of the acrylic sheet, slowing down the conveyor to increase the heat exposure of the acrylic sheet.

Figure 6:
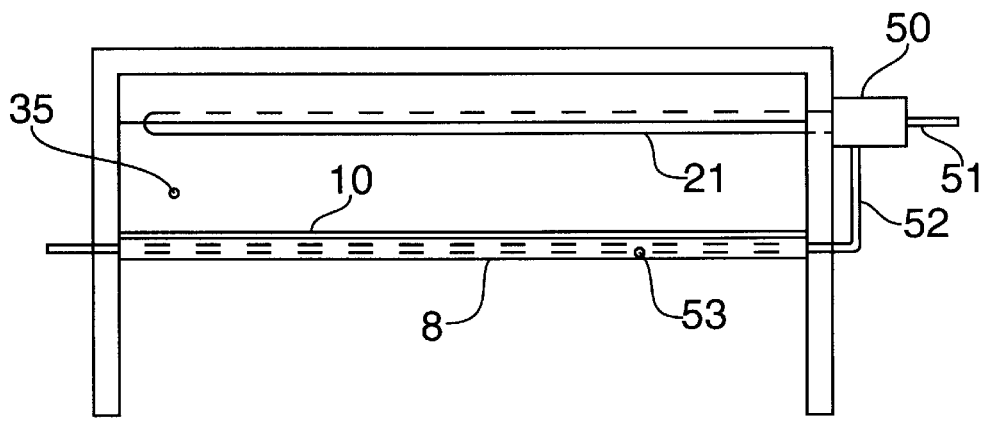
FIG. 6 is a side elevation view of a heater including an exhaust valve for gas exhaust.

As seen in FIG. 1, the exhaust gas from the tube 21 is currently directed away from the heating apparatus 1 to an external vent to atmosphere. Referring to FIG. 6, an exhaust valve 50 may be provided at the exit of the tube 21. An exhaust tube 51 is connected to the valve and is vented to the atmosphere. A reheating tube 52 is also connected to the exhaust valve and is directed to the support platform 8. Chambers 53 are positioned in the support platform to receive the exhaust gas. The chambers may be lined with a material which transmits heat but can withstand high temperatures, such as metals like steel. The exhaust valve can thus direct the exhaust gas to the support platform 10, thereby heating the platform and increasing the heating of the acrylic sheet 300 in the heating area.

In certain applications, it may be desirable to increase the temperature in the heating area 35. The combustible gas flow or temperature can be altered to increase the output of the radiant heating element 20 accordingly. Alternatively, baffle walls 60 may be attached to the frame 2, thereby closing in a portion of the heating area and reflecting the heat which would have been otherwise lost back into the heating area. Further, the exhaust valve 50 can be adjusted to direct a selected amount of the hot exhaust gases to the chambers 53 in the support platform 8. This results in heating the support surface 10 and may be particularly useful when the acrylic sheet 300 is relatively thick.

While this invention has been described with reference to specific embodiments disclosed herein, it is not confined to the details set forth and the patent is intended to include modifications and changes which may come within and extend from the following claims.

What is claimed is:

1. A method of forming a thin acrylic sheet having a top finished surface and a bottom unfinished surface, the method comprising:

provid ing a radiant heating element mounted to a frame and disposed substantially in a heating plane;

providing a support platform mounted to the frame and having a flat support surface that extends substantially parallel to the heating plane, wherein the support surface is disposed between 6 and 10 inches away from the heating plane;

wherein a heating area is defined by the space between the heating plane and the support surface, the heating area having lateral sides, and a substantial portion of the lateral sides of the heating area being exposed to the atmosphere;

heating the radiant heating element to raise the air temperature in the heating area to about 200° F. to about 240° F.;

placing the thin acrylic sheet in its entirety in the heating area such that the top finished surface is on the support surface and the bottom unfinished surface is exposed to the radiant heating element;

leaving the acrylic sheet in its entirety in the heating area for a first selected period of time until the acrylic sheet is moldable;

removing the moldable acrylic sheet from the heating area and positioning the moldable acrylic sheet on a mold to form the acrylic sheet;

leaving the acrylic sheet on the mold for a second selected period of time until the acrylic sheet has cooled, at least in part; and removing the formed thin acrylic sheet from the mold.

2. The method of claim 1 wherein the radiant heating element is heated until the average air temperature in the heating area is about 220° F.

3. The method of claim 1 wherein the radiant heating element is a tube extending through the heating plane and having an inlet, an outlet and a burner for igniting combustible gas, the method further comprising blowing the ignited, combustible gas through the inlet of the tube.

4. The method of claim 3 further comprising directing the combustible gas from the outlet of the tube to a reheating tube and directing the combustible gas from the reheating tube through chambers disposed in the support platform.

5. The method of claim 3 wherein an exhaust valve is disposed at the outlet of the tube, a reheating tube is operably engaged to the exhaust valve and extends proximate to the support platform, and an exhaust tube is operably engaged to the exhaust valve, the method further comprising adjusting the exhaust valve to direct a selected amount of the ignited, combustible gas through the reheating tube.

6. The method of claim 5 wherein the fixed distance between the support surface and the heating plane is about 8 inches.

7. The method of claim 5 wherein a means for displacing the support surface with respect to the frame is attached to the support platform, the method further comprising actuating the displacing means to select the distance between the support surface and the heating plane.

* * * * *